United States Patent [19]

VanRens

[11] Patent Number: 5,080,955
[45] Date of Patent: Jan. 14, 1992

[54] FOAM PATTERN ASSEMBLY AND METHOD FOR MAKING THE SAME

[75] Inventor: Russell J. VanRens, Milwaukee, Wis.

[73] Assignee: Outboard Marine Corporation, Waukegan, Ill.

[21] Appl. No.: 512,826

[22] Filed: Apr. 23, 1990

[51] Int. Cl.$^5$ .................................................. B32B 3/26
[52] U.S. Cl. ....................................... 428/159; 156/78; 428/161; 428/317.1; 428/317.3; 428/316.6
[58] Field of Search ............... 428/317.1, 317.3, 101, 428/159, 160, 161, 316.6; 156/78

[56] References Cited

U.S. PATENT DOCUMENTS

| | | | |
|---|---|---|---|
| 3,133,853 | 5/1964 | Knox | 428/160 |
| 4,274,236 | 6/1981 | Kessler | 428/159 |
| 4,278,728 | 7/1981 | Honda et al. | 428/159 |

FOREIGN PATENT DOCUMENTS 2059397  5/1971  France .................. 428/160

Primary Examiner—William J. Van Balen
Attorney, Agent, or Firm—Michael, Best & Friedrich

[57] ABSTRACT

An evaporable first foam pattern portion adapted to be glued to a second foam pattern portion including a glue surface having thereon a fill gun boss, the first foam pattern portion comprising a glue surface adapted to be glued to the glue surface of the second pattern portion, and a recess in the glue surface of the first foam pattern portion for receiving the fill gun boss on the glue surface of the second pattern portion.

10 Claims, 1 Drawing Sheet

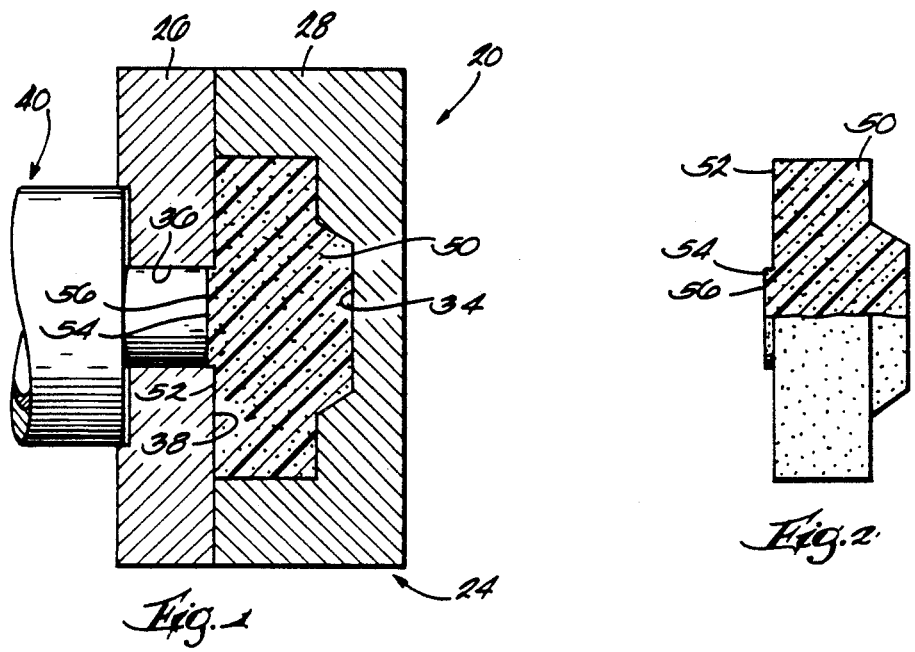
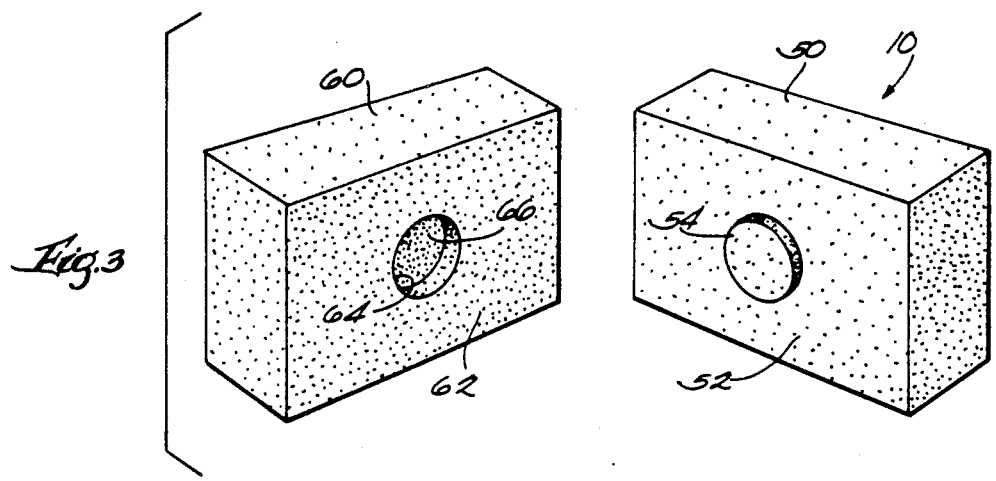
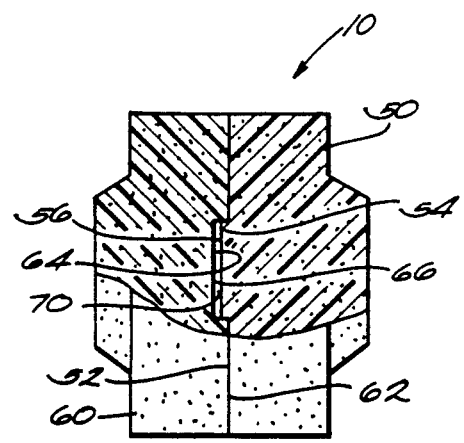

FOAM PATTERN ASSEMBLY AND METHOD FOR MAKING THE SAME

BACKGROUND OF THE INVENTION

The invention relates to evaporable foam patterns used in lost foam casting processes. The invention also relates to methods for manufacturing such foam patterns.

Foam pattern assembly portions are typically injection molded. A conventional mold defines a mold cavity and has therein a passageway communicating with the mold cavity through a wall that will form a glue surface on the resultant foam pattern portion. A fill gun is inserted into the passageway and foam particles are injected into the mold cavity to form the pattern portion. If the end of the fill gun is not flush with the wall forming the glue surface, i.e., if the fill gun backs slightly out of the mold, the result is, on the pattern portion, a boss extending outwardly from the glue surface and into the passageway. This boss must be trimmed off before the glue surface of the foam pattern portion is glued to another pattern portion.

SUMMARY OF THE INVENTION

The invention provides an evaporable first foam pattern portion adapted to be glued to a second foam pattern portion including a glue surface having thereon a fill gun boss, the first foam pattern portion comprising a glue surface adapted to be glued to the glue surface of the second pattern portion, and recess means in the glue surface of the first foam pattern portion for receiving the fill gun boss on the glue surface of the second pattern portion.

The invention also provides a foam pattern assembly comprising a first foam pattern portion including a first glue surface having thereon a fill gun boss, and a second foam pattern portion including a second glue surface mating with the first glue surface and having therein a recess receiving the fill gun boss.

The invention also provides a method for manufacturing a foam pattern assembly, the method comprising the steps of providing a fill gun, providing a mold defining a mold cavity and having therein a passageway communicating with the mold cavity, inserting the fill gun into the passageway and using the fill gun to inject foam particles into the mold cavity to form in the mold cavity a first foam pattern portion including a first glue surface having thereon a boss extending into the passageway, providing a second foam pattern portion including a second glue surface having therein a recess, and gluing the first glue surface to the second glue surface so that the boss extends into the recess.

A principal feature of the invention is the provision of a foam pattern portion including a glue surface having therein a recess adapted to receive a fill gun boss on the glue surface of another pattern portion when the two glue surfaces are glued together. This eliminates the need to trim the fill gun boss off the second pattern portion.

Other features and advantages of the invention will become apparent to those skilled in the art upon review of the following detailed description, claims and drawings.

DESCRIPTION OF THE DRAWINGS

FIG. 1 is a partially sectional view of an apparatus for injection molding a foam pattern portion.

FIG. 2 is an elevational view, partially in section, of the foam pattern portion shown in FIG. 1.

FIG. 3 is an exploded perspective view of a foam pattern assembly embodying the invention and including the pattern portion shown in FIGS. 1 and 2.

FIG. 4 is a sectional view of the foam pattern portions glued together.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A foam pattern assembly 10 which embodies the invention and which is to be used in a lost foam casting process is illustrated in the drawings. An apparatus 20 for manufacturing a portion of the foam pattern assembly 10 is illustrated in FIG. 1.

The apparatus 20 comprises a conventional mold 24 including mold halves 26 and 28 defining a mold cavity 34. The mold 24 has therein a passageway 36 communicating with the mold cavity 34. The mold half 26 includes a wall 38 through which the passageway 36 extends. The apparatus 20 also comprises a fill gun 40 which is inserted into the passageway 36 to inject foam particles into the mold cavity 34 to form in the mold cavity 34 a first foam pattern portion 50.

The foam pattern portion 50 includes a first glue surface 52 that is formed by the mold wall 38. If the fill gun 40 is slightly retracted from the mold 24, i.e., if the end of the fill gun 40 is not flush with the mold wall 38, the first glue surface 52 has thereon a boss 54 extending into the passageway 36 and having an end 56 and a length (the distance from the glue surface 52 to the end 56 of the boss 54) equal to the distance between the mold wall 38 and the end of the fill gun 40. The length of the boss 54 is usually less than 0.050 inches.

The foam pattern assembly 10 also comprises (see FIGS. 3 and 4) a second foam pattern portion 60 including a second glue surface 62 mating with and glued to the first glue surface 52. The second pattern portion 60 also includes recess means in the second glue surface 62 for receiving the fill gun boss 54 on the first glue surface 52. Preferably, this recess means includes a recess 64 which is located in the second glue surface 62 and which has an end wall 66. The recess 64 preferably has a depth (the distance from the second glue surface 62 to the end wall 66) of approximately 0.050 inches. When the first glue surface 52 is glued to the second glue surface 62, as shown in FIG. 4, the boss 54 extends into the recess 64. Alternatively stated, the recess 64 receives the boss 54.

Typically, the height of the boss 54 is less than the depth of the recess 64, so that the boss 54 and the recess 64 define (see FIG. 4) a very small air space 70 located between the end 56 of the boss 54 and the end wall 66 of the recess 64. It has been determined that an air space with a depth of less than 0.050 inches (which would result if the first pattern portion 50 is molded without a fill gun boss) does not have an adverse effect on the lost foam casting process or on the resultant casting.

Various features of the invention are set forth in the following claims.

I claim:

1. An evaporable first foam pattern portion adapted to be glued to a second foam pattern portion including a glue surface having thereon a fill gun boss, said first foam pattern portion comprising a glue surface adapted to be glued to the glue surface of the second pattern portion, and recess means in said glue surface of said first foam pattern portion for receiving the fill gun boss on the glue surface of the second patter portion.

2. A pattern portion as set forth in claim 1 wherein said recess means has a depth of approximately 0.050 inches.

3. A foam pattern assembly comprising a first foam pattern portion including a first glue surface having thereon a fill gun boss, and a second foam pattern portion including a second glue surface mating with said first glue surface and having therein a recess receiving said fill gun boss.

4. A foam pattern assembly as set forth in claim 3 wherein said recess has a depth of approximately 0.050 inches.

5. A foam pattern assembly as set forth in claim 4 wherein said boss has a length of less than 0.050 inches.

6. A foam pattern assembly as set forth in claim 1 wherein said recess has an end wall and depth, and wherein said boss has an end and a length less than said depth, thereby forming an air space between said end and said end wall.

7. A method for manufacturing a foam pattern assembly, said method comprising the steps of providing a fill gun, providing a mold defining a mold cavity and having therein a passageway communicating with said mold cavity, inserting said fill gun into said passageway and using said fill gun to inject foam particles into said mold cavity to form in said mold cavity a first foam pattern portion including a first glue surface having thereon a boss extending into said passageway, providing a second foam pattern portion including a second glue surface having therein a recess, and gluing said first glue surface to said second glue surface s that said boss extends into said recess.

8. A method as set forth in claim 7 wherein said recess has a depth of approximately 0.050 inches.

9. A method as set forth in claim 8 wherein said boss has a length of less than 0.050 inches.

10. A method as set forth in claim 7 wherein said recess has an end wall and a depth, and wherein said boss has an end and a length less than said depth, thereby forming an air space between said end and said end wall.

* * * * *